United States Patent
Hashimoto et al.

(10) Patent No.: US 9,971,064 B2
(45) Date of Patent: May 15, 2018

(54) OPTICAL FILM, IMAGE DISPLAY DEVICE, AND METHOD FOR PRODUCING IMAGE DISPLAY DEVICE

(71) Applicant: NITTO DENKO CORPORATION, Ibaraki-shi, Osaka (JP)

(72) Inventors: Naoki Hashimoto, Ibaraki (JP); Katsunori Takada, Ibaraki (JP); Hiroyuki Takemoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 613 days.

(21) Appl. No.: 13/672,187

(22) Filed: Nov. 8, 2012

(65) Prior Publication Data
US 2013/0114145 A1    May 9, 2013

(30) Foreign Application Priority Data
Nov. 9, 2011   (JP) .................................. 2011-245851

(51) Int. Cl.
*G02B 27/00* (2006.01)
*B05D 5/00* (2006.01)
(Continued)

(52) U.S. Cl.
CPC ................ *G02B 1/11* (2013.01); *B05D 5/063* (2013.01); *G02B 1/105* (2013.01); *G02B 1/12* (2013.01); *G02B 1/14* (2015.01)

(58) Field of Classification Search
CPC ... G02B 1/00; G02B 1/04; G02B 1/10; G02B 1/105; G02B 1/11; G02B 1/118;
(Continued)

(56) References Cited

U.S. PATENT DOCUMENTS 4,624,914 A * 11/1986 Kimura ................. G11B 7/243
427/250
5,506,059 A * 4/1996 Robbins ............. A61B 5/04087
428/201
(Continued)

FOREIGN PATENT DOCUMENTS

JP   2003-326649 A   11/2003
JP   2005-288286 A   10/2005
(Continued)

OTHER PUBLICATIONS

Office Action dated Jan. 25, 2016, issued in counterpart Taiwanese Patent Application No. 101138702, with Partial English translation. (10 pages).
(Continued)

*Primary Examiner* — Thong Nguyen
(74) *Attorney, Agent, or Firm* — Westerman, Hattori, Daniels & Adrian, LLP

(57) ABSTRACT

An optical film to be arranged on a display surface is adapted so as to allow uniform application of an interlayer filler and thus also is applicable to an image display device equipped with a front plate. Preferably, such optical film is for use in an image display device. The optical film is adapted so that a relationship of the following formula (1) is satisfied:

$$b \le 0.2a + 1.8 \quad (1),$$

where a is the viscosity (Pa·s) of an interlayer filler at the time of attaching the front plate to a surface of the optical film via the interlayer filler, and b is the atomic percentage (atm %) of silicon atoms on the surface of the optical film. The atomic percentage of oxygen atoms on the surface of the optical film is at least 26 atm %.

12 Claims, 2 Drawing Sheets

(51) Int. Cl.
    *G02B 1/11*     (2015.01)
    *G02B 1/14*     (2015.01)
    *B05D 5/06*     (2006.01)
    *G02B 1/10*     (2015.01)
    *G02B 1/12*     (2006.01)

(58) Field of Classification Search
    CPC ...... G02B 1/12; G02B 27/0006; C23C 16/30;
                C23C 16/401; C23C 16/56; C23C 16/402;
                C23C 16/0254; C23C 16/0272; C23C
                16/046; C23C 16/26; B05D 5/063; B32B
                17/10018
    See application file for complete search history.

(56) References Cited

U.S. PATENT DOCUMENTS

| | | | | |
|---|---|---|---|---|
| 6,064,762 | A * | 5/2000 | Haenel | G06K 9/38 382/171 |
| 6,103,400 | A * | 8/2000 | Yamada | H01L 41/047 428/457 |
| 7,579,060 | B2 * | 8/2009 | Sakai | C09D 183/04 156/60 |
| 7,863,609 | B2 * | 1/2011 | Ishibashi | C30B 25/02 257/43 |
| 2008/0076882 | A1 | 3/2008 | Ozai | |
| 2008/0102241 | A1 * | 5/2008 | Yutou | C09J 7/0246 428/41.8 |
| 2010/0104879 | A1 | 4/2010 | Okano | |
| 2010/0277675 | A1 * | 11/2010 | Higashi | G02B 1/105 349/96 |
| 2012/0003448 | A1 * | 1/2012 | Weigel | B32B 17/10018 428/212 |
| 2013/0315978 | A1 * | 11/2013 | Nishimura | A61K 9/7053 424/443 |
| 2014/0037887 | A1 * | 2/2014 | Bender | B32B 27/08 428/76 |

FOREIGN PATENT DOCUMENTS

| | | |
|---|---|---|
| JP | 2008-058536 A | 3/2008 |
| JP | 2008-241728 A | 10/2008 |
| TW | 200907401 A | 2/2009 |
| WO | 2006/013066 A2 | 2/2006 |
| WO | 2008/023537 A1 | 2/2008 |
| WO | 2008/156136 A1 | 12/2008 |

OTHER PUBLICATIONS

Office Action dated Aug. 4, 2015, issued in counterpart Japanese Patent Application No. 2011-245851, with partial English translation (6 pages).

* cited by examiner

OPTICAL FILM, IMAGE DISPLAY DEVICE, AND METHOD FOR PRODUCING IMAGE DISPLAY DEVICE

CROSS-REFERENCE TO RELATED APPLICATION

This application claims priority from Japanese Patent Application No. 2011-245851, filed on Nov. 9, 2011, the entire contents of which being incorporated herein by reference.

BACKGROUND OF THE INVENTION

Field of the Invention

The present invention relates to an optical film, an image display device, and a method for producing an image display device.

Description of Related Art

Heretofore, optical films such as a hard coat film and an antiglare film are arranged on a display surface of an image display device such as a liquid crystal display (LCD), for the purpose of preventing the display surface from being damaged (i.e., improving the mechanical strength of the display surface) and preventing reflected glare of external light, for example. In recent years, for example, for the sake of design and improvement in mechanical strength of a display surface, image display devices with a front plate formed of a transparent plastic, glass, or the like being provided at their outermost display surface have been introduced to the market. When the front plate is attached to the outermost display surface, a space is formed between the optical film arranged on the display surface and the front plate. Thus, in order to fill this space, a resin (interlayer filler) intervenes as an interlayer between the front plate and the outermost optical film (e.g., JP 2008-241728 A). In JP 2008-241728 A, an active energy ray-curable resin such as a photocurable resin is used as the interlayer filler.

SUMMARY OF THE INVENTION

However, when the interlayer filler is applied to a surface of the optical film to fill the space between the front plate and the optical film, the interlayer filler may be repelled by the surface of the optical film. The interlayer filler thus cannot be applied uniformly the surface of the optical film, resulting in lower process yield.

With the foregoing in mind, it is an object of the present invention to provide an optical film to be arranged on a display surface, which is adapted so as to allow uniform application of an interlayer filler and thus also is applicable to an image display device equipped with a front plate.

In order to achieve the above object, the present invention provides an optical film for use in an image display device equipped with a front plate, wherein the optical film is adapted so that a relationship of the following formula (1) is satisfied:

$$b \leq 0.2a+1.8 \quad (1),$$

where a is the viscosity (Pa·s) of an interlayer filler at the time of attaching the front plate to a surface of the optical film via the interlayer filler, and b is the atomic percentage (atm %) of silicon atoms on the surface of the optical film, and the atomic percentage of oxygen atoms on the surface of the optical film is at least 26 atm %.

The present invention also provides an image display device including: a front plate; and an optical film arranged on a surface of the image display device. The front plate is attached to the optical film via an interlayer filler. The optical film is the optical film according to the present invention.

The present invention also provides a method for producing an image display device that includes a front plate and an optical film. The method includes the steps of: applying an interlayer filler to a surface of the optical film; and attaching the front plate to the optical film to which the interlayer filler has been applied. In this method, the optical film is the optical film according to the present invention.

According to the present invention, the relationship between the viscosity of the interlayer filler and the atomic percentage of silicon (Si) on the surface of the optical film is specified, and the atomic percentage of oxygen (O) on the surface of the optical film is set to at least 26 atm %. With this configuration, the interlayer filler can be applied uniformly to the surface of the optical film. Thus, the present invention can provide an optical film that also is applicable to an image display device equipped with a front plate.

DETAILED DESCRIPTION OF THE INVENTION

Figure 1:
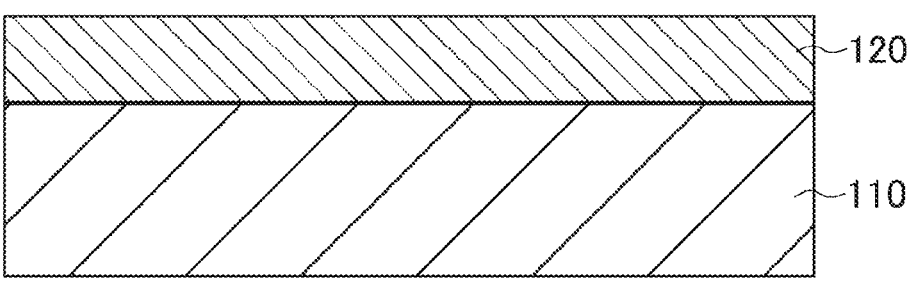
FIG. 1 is a schematic sectional view showing an example of the structure of the optical film (hard coat film) according to the present invention.

In the optical film of the present invention, the surface of the optical film is a surface to which the front plate is to be attached via the interlayer filler (an attachment surface). More specifically, it refers to a portion of the optical film with a vertical depth of 20 nm or less from the attachment surface, for example. The front plate may be, for example, a glass plate or a resin plate, which optionally may have an optical function of a sensor-equipped touch panel or the like.

The optical film of the present invention preferably includes a hard coat layer.

The hard coat layer preferably is formed in an atmosphere with an oxygen concentration of 500 to 50000 ppm.

The hard coat layer preferably contains a leveling agent.

The leveling agent preferably is an unreactive leveling agent.

It is preferable that the optical film has a modified surface, and that the surface has been modified by at least one treatment selected from the group consisting of: a solvent treatment, an alkali treatment, a plasma irradiation treatment, and a corona irradiation treatment.

In the image display device of the present invention, the viscosity of the interlayer filler at the time of attaching the front plate to the surface of the optical film via the interlayer filler falls within the range satisfying the relationship of the formula (1), which defines the relationship thereof with the atomic percentage of silicon atoms on the surface of the optical film. Preferably, the interlayer filler is an active energy ray-curable resin. The active energy ray-curable resin is a resin that can be cured by irradiation with ultraviolet rays or an electron beam, for example. Specific examples of the active energy ray-curable resin include acrylic resins (acrylate, urethane acrylate), epoxy resins, silicone resins, rubber resins, and xylene resins Examples of the xylene resins include: alkylphenol-modified xylene resins; hydrophilic xylene resins such as resole and polyol; and hydrophobic xylene resins. The interlayer filler is not limited to the active energy ray-curable resin, and may be a thermosetting resin, for example.

The present invention will be described more specifically below. It is to be noted, however, that the following description does not limit the present invention by any means.

The optical film according to the present invention is an optical film for use in an image display device. As described above, the viscosity of the interlayer filler and the atomic percentage of silicon atoms (Si atomic percentage) on the surface of the optical film satisfy the relationship of the formula (1), and the atomic percentage of oxygen atoms (O atomic percentage) on the surface of the optical film is set to at least 26 atm %. The optical film of the present invention may be, for example, a film that includes a hard coat layer as an optically functional layer (i.e., a hard coat film). The optical film of the present invention will be described specifically below with reference to an illustrative example where the optical film is a hard coat film. It is to be noted, however, that the optical film of the present invention is by no means limited to a hard coat film.

The hard coat film of the present invention is a resin film having a hard coat layer on its surface, and the structure thereof is as shown in FIG. 1, for example. FIG. 1 is a schematic sectional view showing an example of the structure of the hard coat film of the present invention. As shown in FIG. 1, this hard coat film 100 includes a resin film 110 and a hard coat layer 120 formed on the resin film 110.

The resin film is not particularly limited. Preferably, the resin film has a high visible light transmittance (preferably a light transmittance of at least 90%) and a high transparency (preferably a haze value of not more than 1%). Examples of such a film include a transparent plastic film base described in JP 2008-90263 A. As the resin film, the one with low optical birefringence can be used suitably. The hard coat film of the present invention also can be used as a protective film in a polarizing plate, for example. In this case, the resin film preferably is a film formed of triacetyl cellulose (TAC), polycarbonate, an acrylic polymer, a polyolefin with a cyclic or norbornene structure, or the like. In the present invention, the resin film may be a polarizer itself, as will be described below. With this configuration, it is not necessary to provide a protective layer formed of TAC or the like, so that the structure of the polarizing plate can be simplified. This allows the number of process steps to be reduced in the production of the polarizing plate or an image display device including the same, whereby the production efficiency can be improved. Furthermore, with this configuration, it is possible to make the polarizing plate still thinner. In the case where the resin film is a polarizer, the hard coat layer serves as a conventional protective layer. Still further, with this configuration, for example, in the case where a front plate is not provided on a surface of a liquid crystal cell, the hard coat film also serves as a cover plate when it is mounted on the surface of the liquid crystal cell, for example.

The thickness of the resin film is not particularly limited. Preferably, the thickness of the resin film is in the range from 10 to 500 μm, more preferably from 20 to 300 μm, and optimally from 30 to 200 μm, in view of the strength, workability such as handleability, and thinness, for example. The refractive index of the resin film is not particularly limited, and is, for example, in the range from 1.30 to 1.80, preferably from 1.40 to 1.70.

The hard coat layer is formed of a hard coat layer-forming material that contains an ultraviolet reactive resin(s) and a solvent(s), for example. Examples of the ultraviolet reactive resin include ultraviolet-curable resins that are cured by irradiation with ultraviolet rays. Commercially available ultraviolet-curable resins and the like also can be used.

As the ultraviolet-curable resin, it is possible to use, for instance, a curable compound having at least one of a light (ultraviolet)-curable acrylate group and a light (ultraviolet)-curable methacrylate group, and examples thereof include: silicone resins; polyester resins; polyether resins; epoxy resins; urethane resins; alkyd resins; spiroacetal resins; polybutadiene resins; polythiol polyene resins; and oligomers and prepolymers of acrylates and methacrylates of polyfunctional compounds such as polyhydric alcohols. Any one of them may be used alone, or two or more of them may be used in combination.

As a diluent for the ultraviolet reactive resin, it is possible to use a reactive diluent having at least one of an acrylate group and a methacrylate group, for example. As the reactive diluent, those described in, e.g., JP 2008-88309 A can be used, and examples thereof include monofunctional acrylates, monofunctional methacrylates, polyfunctional acrylates, and polyfunctional methacrylates. As the reactive diluent, it is preferable to use a trifunctional or higher-functional acrylate or a trifunctional or higher-functional methacrylate, because they can improve the hardness of the hard coat layer. Examples of the reactive diluent further include: butanediol glycerin ether diacrylate; acrylates of isocyanuric acid; and methacrylates of isocyanuric acid. Any one of them may be used alone, or two or more of them may be used in combination.

The hard coat layer-forming material may further contain a reaction initiator(s), which preferably is a radical-forming initiator of ultraviolet reactive type. Examples of the ultraviolet reactive radical-forming initiator include: acetophenones, benzoins, benzophenones, phosphine oxides, ketals, anthraquinones, thioxanthones, azo compounds, peroxides, 2,3-alkylione compounds, disulfide compounds, fluoroamine compounds, and aromatic sulfoniums. Examples of the acetophenones include 2,2-ethoxyacetophenone, p-methylacetophenone, 1-hydroxydimethylphenylketone, 1-hydroxycyclohexylphenylketone, 2-methyl-4-methylthio-2-morpholinopropiophenone, and 2-benzyl-2-dimethylamino-1-(4-morpholinophenyl)-butanone. Examples of the benzoins include benzoin benzene sulfonate ester, benzoin toluene sulfonate ester, benzoin methyl ether, benzoin ethyl ether, and benzoin isopropyl ether. Examples of the benzophenones include benzophenone, 2,4-chlorobenzophenone, 4,4-dichlorobenzophenone, and p-chlorobenzophenone. Examples of the phosphine oxides include 2,4,6-trimethylbenzoyl diphenylphosphine oxide. Among them, "IRGACURE 184 (trade name)" or "IRGACURE 907 (trade name)" manufactured by Ciba Specially Chemicals Inc. can be used particularly preferably. Any one of them may be used alone, or two or more of them may be used in combination.

The solvent is not particularly limited, and various kinds of solvents can be used. One kind of solvent may be used alone, or two or more kinds of solvents may be used in combination. Examples of the solvent include, but not particularly limited to: alcohols such as methanol, ethanol, isopropyl alcohol, butanol, and 2-methoxyethanol; ketones such as acetone, methyl ethyl ketone, methyl isobutyl ketone, and cyclopentanone; esters such as methyl acetate, ethyl acetate, and butyl acetate; ethers such as diisopropylether and propylene glycol monomethyl ether; glycols such as ethylene glycol and propylene glycol; cellosolves such as ethyl cellosolve and butyl cellosolve; aliphatic hydrocarbons such as hexane, heptane, and octane; and aromatic hydrocarbons such as benzene, toluene, and xylene.

The hard coat layer-forming material may contain any of various kinds of leveling agents. The leveling agent improves the appearance of the resultant hard coat film. As the leveling agent, for example, an unreactive leveling agent or a reactive leveling agent can be used for the purpose of preventing unevenness in coating (i.e., obtaining an even coated surface). Among them, the unreactive leveling agent is preferable. When the unreactive leveling agent is used, it is possible to decrease the Si atomic percentage on the surface of the hard coat layer more easily by surface modification to be described below, for example. Examples of the unreactive leveling agent include, but not particularly limited to, fluorine leveling agents and silicone leveling agents. Examples of the reactive leveling agent include, but not particularly limited to, leveling agents having a fluorine or silicone backbone and having a reactive polymerizable group, for example. In the hard coat film of the present invention, the kind of the leveling agent can be selected as appropriate depending on an anti-reflection layer (a low refractive index layer) to be formed on the hard coat layer, for example.

The amount of the leveling agent contained in the hard coat layer-forming material is, for example, in the range from 0.05 to 2 parts by weight with respect to 100 parts by weight of the ultraviolet reactive resin. By setting the amount of the leveling agent in the above-described range, uneven coating of the hard coat layer-forming material can be prevented more effectively, for example. Preferably, the amount of the leveling agent is in the range from 0.1 to 1.5 parts by weight, more preferably from 0.5 to 1.25 parts by weight.

As described above, the hard coat layer is formed in an atmosphere with an oxygen concentration of 500 to 50000 ppm, for example. By forming the hard coat layer in an atmosphere with such an oxygen concentration, silicon atoms (and fluorine atoms) on the surface of the hard coat film of the present invention can be removed more easily at the time of performing surface modification, such as an alkali treatment, to be performed after the hard coat layer-forming material has been cured, for example. Owing to the increase in O atomic percentage and the decrease in Si atomic percentage (and F atomic percentage) on the surface of the hard coat layer, the Si atomic percentage can be set in a suitable range, whereby the wettability is improved. It is speculated that the increase in O atomic percentage on the surface of the hard coat layer is caused by the fact that Si atoms and F atoms on the surface of the hard coat layer are removed by the surface modification, and O atoms derived from the ultraviolet reactive resin etc. contained in the hard coat layer-forming material or O atoms introduced to the hard coat layer by the surface modification appear in portions where the Si atoms and F atoms have been removed, for example. It is to be noted, however, that the present invention is by no means restricted or limited by this speculation. The hard coat layer preferably is formed in an atmosphere with an oxygen concentration of 500 to 50000 ppm, more preferably in an atmosphere with an oxygen concentration of 2500 to 15000 ppm.

Preferably, the hard coat film of the present invention has a modified surface, as described above. By modifying the surface of the hard coat film of the present invention, the wettability of the interlayer filler can be improved, for example. The surface modification can be achieved by an alkali treatment (a saponification treatment), a plasma irradiation treatment, a corona irradiation treatment, a solvent treatment, or the like, for example. Among these treatments, an alkali treatment is preferable. Any one of these surface modification methods may be used alone, or two or more of them may be used in combination.

The solvent treatment may be, for example, bringing a solvent into contact with a surface of the hard coat layer and washing the surface with the solvent. By this solvent treatment, substances (e.g., substances containing silicon atoms) attached to the surface of the hard coat layer can be washed away, for example. The solvent to be used in the solvent treatment is not particularly limited, and may be water, an organic solvent, an inorganic solvent, or a mixed solvent thereof, for example. Examples of the organic solvent include alcohols such as methanol and ethanol.

The alkali treatment may be, for example, bringing an alkali aqueous solution such as a sodium hydroxide aqueous solution or a potassium hydroxide aqueous solution into contact with a surface of the hard coat layer. Specifically, this alkali treatment is carried out by, for example, immersing the hard coat film in the alkali aqueous solution. The concentration of the alkali aqueous solution, the immersion time, the temperature, and the like at the time of immersing the hard coat film can be set as appropriate, for example.

The plasma irradiation treatment may be, for example, a plasma discharge treatment in $N_2$ or in the atmosphere. The irradiation time, the discharge voltage, and the like can be selected as appropriate. By this plasma irradiation treatment, for example, it is possible to remove silicon atoms (and fluorine atoms etc.), which inhibit the wetting on the surface of the hard coat layer, and to increase the O atomic percentage on the surface without degrading the appearance of the film, whereby the wettability is improved.

The corona irradiation treatment may be, for example, a corona discharge treatment in $N_2$ or in the atmosphere. The irradiation time, the discharge voltage, and the like can be selected as appropriate. By this corona irradiation treatment, for example, it is possible to remove silicon atoms (and fluorine atoms etc.), which inhibit the wetting on the surface of the hard coat layer, and to increase the O atomic percentage on the surface without degrading the appearance of the film, whereby the wettability is improved.

When the front plate is attached to the hard coat film of the present invention via the interlayer filler, the front plate is attached to the hard coat layer-side surface of the hard coat film, for example. Thus, in the hard coat film of the present invention, "the surface of the optical film" is a surface of the hard coat layer (on the side opposite to the resin film side). More specifically, it refers to a portion with a vertical depth of 20 nm or less from the surface of the hard coat layer (i.e., a surface portion of the hard coat layer), for example.

In the hard coat film of the present invention, the Si atomic percentage (atm %) in the surface portion and the viscosity of the interlayer filler satisfy the relationship of the following formula (1). In addition, the O atomic percentage in the surface portion is at least 26 atm %. With this configuration, the hard coat film of the present invention allows the interlayer filler to be applied uniformly on the surface of the hard coat layer. Thus, the hard coat film of the present invention can be used suitably in an image display device equipped with a front plate. As described above, optical films such as a hard coat film and an antiglare film generally are arranged on a display surface of an image display device such as a liquid crystal television. In the entire image display device market, front plate-equipped models account for a small percentage. Thus, development of optical films such as a hard coat film and an antiglare film applicable to image display devices equipped with or without a front plate has been demanded from the viewpoint of productivity improvement by common application of components in the market. It is advantageous if an optical film such as a hard coat film or an antiglare film for the above-described use is configured so that an interlayer filler can be applied uniformly to its surface. However, as described above, there has been a problem in that, when the interlayer filler is applied to the surface of the optical film, the surface of the optical film may repel the interlayer filler, thus making the uniform application of the interlayer filler difficult. The present invention can solve this problem and thus can realize the productivity improvement by common application of components in the market, for example. In the present invention, uniform application of the interlayer filler means that, for example, the interlayer filler is repelled by the hard coat layer so slowly that the state where the wet interlayer filler spreads over the entire surface of the hard coat layer can be kept from its application until a lapse of a predetermined time at ordinary temperature. Because the state where the wet interlayer filler spreads can be kept for a predetermined time, a high yield rate can be secured in the process of attaching a front plate to the hard coat film of the present invention via the interlayer filler, for example.

$$b \leq 0.2a + 1.8 \qquad (1)$$

a: viscosity of interlayer filler (Pa·s)
b: Si atomic percentage (atm %) on hard coat layer surface It is speculated that the hard coat film of the present invention exhibits the above-described advantageous effect by the following mechanism. It is to be noted, however, that the present invention is by no means restricted or limited by this speculation. Generally, in a hard coat film including a hard coat layer, when the Si atomic percentage is high and the O atomic percentage is low on a surface of the hard coat layer, a material for forming another layer further applied thereto is repelled by the surface of the hard coat layer. Thus, in the present invention, for example, by forming the hard coat layer in an atmosphere with the predetermined oxygen concentration and then modifying the surface of the hard coat layer, the O atomic percentage on the surface of the hard coat layer is set to at least 26 atm %. Besides, the viscosity of an interlayer filler applied to the surface of the hard coat layer is set so as to satisfy the relationship of the formula (1), which defines the relationship thereof with the Si atomic percentage on the surface of the hard coat layer. With this configuration, uniform application of the interlayer filler becomes possible. In the present invention, it is preferable to form a hard coat layer using a hard coat layer-forming material with a high Si atomic percentage. This is because, when the hard coat layer-forming material is applied to the resin film in such a manner that the silicon (Si) atomic percentage on a surface of the resultant hard coat layer would be low, unevenness may occur in the resultant coating (i.e., hard coat layer), which degrades the appearance of the hard coat film. By increasing the Si atomic percentage in the hard coat layer-forming material, it is possible to prevent unevenness in coating. In the hard coat film, the recoatability for a material for forming another layer on the hard coat layer is in a trade-off relationship with the appearance of the hard coat film. However, with the above-described configuration, the hard coat film of the present invention can achieve both excellent recoatability and excellent appearance, for example.

In the hard coat film of in the present invention, as described above, by the above-described surface modification of the hard coat layer, it is possible to decrease the Si atomic percentage and increase the O atomic percentage on the surface of the hard coat layer, for example. This allows the use of an interlayer filler with a lower viscosity while satisfying the relationship of the formula (1), thus expanding the range of applicable interlayer fillers, for example. In the present invention, it is preferable to set the O atomic percentage on the surface of the hard coat layer to at least 26 atm % by the surface modification. This allows the Si atomic percentage to be decreased sufficiently, for example. Moreover, by the surface modification, it is also possible to remove not only silicon but also components (elements) with low surface free energy, such as fluorine, for example.

The method for controlling the Si atomic percentage and the O atomic percentage on the surface of the hard coat layer may be, for example, causing a compound with a structure of any of the following chemical formulae (1) to (3) to be present on the surface of the hard coat layer. The method for causing the above-described compound to be present on the surface of the hard coat layer may be, for example, adding the above-described compound to a hard coat layer-forming material, applying this hard coat layer-forming material to the resin film, and then curing the resultant coating by drying.

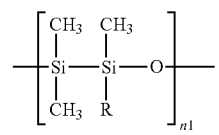

(1)

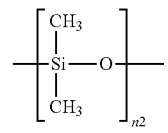

(2)

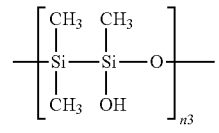

(3)

In the chemical formula (1), R is an epoxy group, an alicyclic epoxy group, an amino group, a polyether group, a methacryl group, a carboxyl group, a phenol group, a phenyl group, a mercapto group, or a hydroxyl group, for example, and n1 is 10 to 2000, for example. In the chemical formulae (2) and (3), n2 and n3 are each any positive integer.

The O atomic percentage on the surface of the hard coat layer is at least 26 atm %, preferably at least 30 atm %.

The Si atomic percentage on the surface of the hard coat layer is set so as to satisfy the relationship of the formula (1), and it preferably is 2.4 atm % or less, more preferably 1.8 atm % or less.

The viscosity of the interlayer filler is set so as to satisfy the relationship of the formula (1). The viscosity of the interlayer filler is, for example, in the range from 0.5 to 15

Pa·s. The cause of the repelling of the interlayer filler by the hard coat layer generally is considered to be a large difference in surface free energy between the interlayer filler and the hard coat layer. When the interlayer filler exhibits a viscosity of 0.5 Pa·s or more, for example, the interlayer filler does not move on the hard coat layer and no aggregation of the interlayer filler is caused, so that the above-described repelling is not promoted. When the interlayer filler exhibits a viscosity of not more than 15 Pa·s, it can be applied to the hard coat layer more uniformly, for example. The viscosity of the interlayer filler preferably is in the range from 1 to 10 Pa·s, more preferably from 3 to 8.5 Pa·s.

The hard coat layer may contain particles. The particles may be added to the hard coat layer-forming material for the purpose of making the surface of the resultant hard coat layer uneven so as to impart antiglare properties to the hard coat layer and controlling the haze value of the hard coat layer. The haze value of the hard coat layer can be designed by controlling the difference in refractive index between the particles and the ultraviolet reactive resin. The particles may be, for example, inorganic particles or organic particles. Examples of the inorganic particles include, but not particularly limited to, silicon oxide particles, titanium oxide particles, aluminium oxide particles, zinc oxide particles, tin oxide particles, calcium carbonate particles, barium sulfate particles, talc particles, kaoline particles, and calcium sulfate particles. Examples of the organic particles include, but not particularly limited to, polymethyl methacrylate resin powders (PMMA fine particles), silicone resin powders, polystyrene resin powders, polycarbonate resin powders, acrylic styrene resin powders, benzoguanamine resin powders, melamine resin powders, polyolefin resin powders, polyester resin powders, polyamide resin powders, polyimide resin powders, and polyfluoroethylene resin powders. Only one kind of these inorganic particles and organic particles may be used alone, or two or more kinds of them may be used in combination.

The particles preferably has a weight average particle diameter in the range from 0.5 to 10 μm. By setting the weight average particle diameter of the particles in the above-described range, it is possible to provide a hard coat film that has more excellent anti-glare properties and can prevent white blur more effectively, for example. It is more preferable that the weight average particle diameter of the particles is in the range from 2 to 8 μm. The weight average particle diameter of the particles can be measured by the Coulter counter method, for example. For example, with the use of a particle size distribution analyzer (trade name: COULTER MULTISIZER, Beckman Coulter, Inc.) based on a pore electric resistance method, the weight average particle diameter of the particles is calculated by measuring the electric resistance of an electrolyte solution corresponding to the volume of the particles when they pass through the pores and determining the number and the volume of the particles.

The shape of the particles is not particularly limited. For example, the particles may have a substantially spherical shape like beads, or may have an indefinite shape like powder or the like. Preferably, the particles have a substantially spherical shape, more preferably a substantially spherical shape with an aspect ratio of 1.5 or less, and most preferably a spherical shape.

The proportion of the particles in the hard coat layer preferably is in the range from 0.5 to 20 parts by weight, more preferably from 3 to 10 parts by weight, with respect to 100 parts by weight of the ultraviolet reactive resin. By setting the proportion of the particles in the above-described range, it is possible to provide a hard coat film that has more excellent anti-glare properties and can prevent white blur more effectively, for example.

The hard coat layer-forming material further may contain a pigment, a filler, a dispersant, a plasticizer, a surfactant, an antifouling agent, an antioxidant, and a thixotropy imparting agent, when necessary. The amount of each additive is set so as not to hinder the function of the hard coat layer-forming material. Any one of these additives may be used alone, or two or more of them may be used in combination.

The thickness of the hard coat layer is calculated by measuring the overall thickness of the hard coat film of the present invention and then subtracting the thickness of the resin film from the overall thickness. The overall thickness and the thickness of the resin film can be measured with a micrometer-scale thickness gauge, for example.

The thickness of the hard coat layer is not particularly limited, and preferably is in the range from 1 to 20 μm. By setting the thickness of the hard coat layer in the above-described range, it is possible to prevent the hard coat film from curling, whereby the decrease in the productivity due to a trouble when conveying the film can be avoided, for example. The thickness of the hard coat layer more preferably is in the range from 2 to 15 μm, still more preferably from 3 to 10 μm.

When anti-glare properties are imparted to the hard coat film of the present invention, the haze value of the hard coat film is not particularly limited, and can be set as appropriate depending on the intended use of a display to be provided with the hard coat film, for example.

The hard coat film of the present invention can be formed in the following manner, for example. First, a hard coat layer-forming material containing an ultraviolet reactive resin and a solvent is provided. The hard coat layer-forming material is then applied to at least one surface of a resin film, thereby forming a coating. The coating is cured by ultraviolet irradiation, thus forming a hard coat layer. The surface of the thus-formed hard coat layer may be subjected to the above-described surface modification. In the production of the hard coat film of the present invention, a method for providing an uneven surface by an appropriate way such as transfer using a die, sand-blasting, or embossing using an emboss roll also can be used in combination, for example.

The hard coat layer-forming material may be applied by a coating method such as fountain coating, die coating, spin coating, spray coating, gravure coating, roll coating, or bar coating.

It is preferable to dry the coating before curing it. The drying may be achieved by, for example, natural drying, air drying by blowing air, heat drying, or a drying method using them in an appropriate combination. The drying temperature, the drying time, and the like can be selected as appropriate.

As described above, it is preferable to cure the coating in an atmosphere with an oxygen concentration of 500 to 50000 ppm. When the hard coat layer is formed by curing the coating under such a condition, silicon atoms (and fluorine atoms) on the surface of the hard coat film of the present invention can be removed more easily at the time of performing surface modification, such as an alkali treatment, to be performed after the hard coat layer-forming material has been cured, for example. Owing to the increase in O atomic percentage and the decrease in Si atomic percentage (and F atomic percentage) on the surface of the hard coat layer, the Si atomic percentage can be set in a suitable range, whereby the wettability is improved. It is speculated that the increase in O atomic percentage on the surface of the hard coat layer is caused by the fact that Si atoms and F atoms on the surface of the hard coat layer are removed by the surface modification, and O atoms derived from the ultraviolet reactive resin etc. contained in the hard coat layer-forming material or O atoms introduced to the hard coat layer by the surface modification appear in portions where the Si atoms and F atoms have been removed, for example. It is to be noted, however, that the present invention is by no means restricted or limited by this speculation.

The ultraviolet irradiation dose preferably is 50 to 500 mJ/cm$^2$ in terms of cumulative exposure energy at an ultraviolet wavelength of 365 nm. When the irradiation dose is 50 mJ/cm$^2$ or more, the coating is cured more sufficiently, so that the resultant hard coat layer can have still more sufficient hardness. Also, when the dose is 500 mJ/cm$^2$ or less, it is possible to prevent the occurrence of coloration in the resultant hard coat layer.

As described above, in the present invention, for example, by forming a hard coat layer using a hard coat layer-forming material with a high Si atomic percentage, unevenness in coating is prevented, thus producing a hard coat film with good appearance. The Si atomic percentage in the solid content of the hard coat layer-forming material preferably is in the range from 1 to 7 atm %, more preferably from 1.5 to 7 atm %. Thus, the method for adjusting the Si atomic percentage in the solid content of the hard coat layer-forming material also can be referred to as a method for improving the appearance of the hard coat film, for example.

As described above, an alkali treatment is preferable as the surface modification. Specific examples of the alkali treatment are as described above.

The hard coat film of the present invention can be produced by forming the hard coat layer on at least one surface of the resin film in a manner described above. The hard coat film of the present invention may be produced by a method other than the above-described method. The hardness of the hard coat film of the present invention, which also is influenced by its thickness, preferably is 2H or more in terms of pencil hardness. Although the hard coat layer of this example has a single layer structure, the hard coat film of the present invention is not limited thereto and the hard coat layer may have a multilayer structure including two or more layers. When the hard coat layer has a multilayer structure, the surface modification may be performed with respect to an outermost layer, for example.

The hard coat film of the present invention may be configured so that an anti-reflection layer (a low refractive index layer) is arranged on the hard coat layer. For example, when an image display device is provided with a hard coat film, reflection of light at the interface between air and the hard coat layer image is one of the factors that cause the decrease in visibility of images. The anti-reflection layer is provided so as to reduce this surface reflection. The hard coat layer and the anti-reflection layer may be formed on each surface of the resin film. In this case, it is only necessary that the hard coat layer provided on a surface of the hard coat film of the present invention to which the front plate is to be attached is configured so that the Si atomic percentage and the O atomic percentage on its surface are as described above. The hard coat layer and the anti-reflection layer each may have a multilayer structure including two or more layers. When the anti-reflection layer is arranged on the hard coat layer, the surface modification may be performed with respect to the anti-reflection layer as an outermost layer, for example.

In the present invention, the anti-reflection layer includes one or more optical thin films each having a strictly controlled thickness and a strictly controlled refractive index. The anti-reflection layer exhibits an anti-reflection function by causing the opposite phases of incident light and reflected light to cancel out each other utilizing the interference effect of light. The wavelength range of visible light that allows the anti-reflection function to be exhibited is, for example, from 380 to 780 nm. The wavelength range in which the luminous factor is particularly high is from 450 to 650 nm, and the anti-reflection layer preferably is designed so that it exhibits the smallest reflectance at 550 nm, which is the center wavelength of this range.

In designing the anti-reflection layer based on the light interference effect, the method for enhancing the interference effect may be, for example, increasing the difference in refractive index between the anti-reflection layer and the hard-coating layer. Generally, in an anti-reflection layer with a multilayer structure including two to five optical thin films (each having a strictly controlled thickness and a strictly controlled refractive index), the plurality of layers each having a predetermined thickness are formed of components with different refractive indices. This increases the degree of freedom in optical design of the anti-reflection layer. Thus, the anti-reflection effect can be further improved, and also, the spectral reflection characteristics can be made uniform (flat) over the visible light region. Since each optical thin film must be highly precise in thickness, the optical thin film generally is formed by a dry process such as vacuum deposition, sputtering, or CVD.

In the hard coat film configured so that the hard coat layer is formed on one surface of the resin film, the other surface of the resin film may be subjected to a solvent treatment in order to prevent the occurrence of curling. Alternatively, in the hard coat film configured so that the hard coat layer is formed one surface of the resin film, a transparent resin layer may be formed on the other surface of the resin film in order to prevent the occurrence of curling.

Although the optical film of the present invention has been described above with reference to an example where the optical film is a hard coat film, the optical film of the present invention is not limited to a hard coat film. The optical film of the present invention may be a film obtained by forming an optically functional layer other than a hard coat layer on a resin film, for example. The optically functional layer other than the hard coat layer may be, for example, an anti-glare layer, an anti-reflection layer, and an optical compensation layer. In the optical film with such a configuration, the optically functional layer is formed on a surface to which the front plate is to be attached, and the surface of the optically functional layer is as stated above in the description regarding the above-described hard coat film.

The optical film of the present invention may not be provided with the above-described optically functional layer. In the optical film with such a configuration, the surface to which the front plate is to be attached is as stated above in the description regarding the above-described hard coat film. Examples of a resin film to be used for this optical film include the same resin films as described above. Also, this optical film may be a polarizing plate. When the optical film is a polarizing plate obtained by forming a transparent protective film on one or each surface of a polarizer, the front plate may be attached to the surface provided with the transparent protective film or to the surface not provided with the transparent protective film (i.e., the surface of the polarizer). The surface to which the front plate is to be attached is as stated above in the description regarding the above-described hard coat film. The protective film or the polarizer in this polarizing plate preferably is subjected to the surface modification, as described above. Examples of a material for forming the transparent protective film include the same materials as given above as examples of the material for forming the resin film.

Generally, the hard coat film of the present invention can be attached to an optical element used in LCD or the like by attaching a surface thereof on the resin film side (the side opposite to the front plate attachment surface side) to the optical element via a pressure-sensitive adhesive or an adhesive. To this end, the resin film-side surface (the surface on the side opposite to the front plate attachment surface-side) may be subjected to any of the above-described various surface treatments.

The optical element is, for example, a polarizer or a polarizing plate. A polarizing plate generally is obtained by providing a transparent protective film on one or each side of a polarizer. When the transparent protective films are formed on both surfaces of the polarizer, the transparent protective films on the respective sides may be formed of the same material or different materials. Generally, polarizing plates are arranged on both sides of a liquid crystal cell. The two polarizing plates are arranged so that their absorption axes are substantially orthogonal to each other.

Next, an optical element including the hard coat film of the present invention laminated thereon will be described with reference to an example where the optical element is a polarizing plate. A polarizing plate having the function of the present invention can be obtained by laminating the hard coat film of the present invention on a polarizer or a polarizing plate via an adhesive or a pressure-sensitive adhesive.

The polarizer is not particularly limited, and various kinds of polarizers may be used. Examples of the polarizer include: films obtained by allowing hydrophilic polymer films such as a polyvinyl alcohol-based film, a partially-formalized polyvinyl alcohol-based film, and a partially-saponified film based on ethylene-vinyl acetate copolymer to adsorb a dichroic substance such as iodine or a dichroic dye, followed by uniaxial stretching; and alignment films based on polyenes such as dehydrated polyvinyl alcohol and dehydrochlorinated polyvinyl chloride.

As the transparent protective film to be provided on one or each surface of the polarizer, films that are excellent in transparency, mechanical strength, thermal stability, moisture shielding property, retardation value stability, etc. are preferable. Examples of a material for forming the transparent protective film include the same materials as given above as examples of the material for forming the resin film.

The transparent protective film may be, for example, the polymer film described in JP 2001-343529 A (WO 01/37007). The polymer film can be produced by extruding a resin composition into a film shape. The polymer film has a low retardation and a low photoelastic coefficient. Thus, when the polymer film is used as a protective film for a polarizing plate etc., it is possible to solve problems such as irregularity caused by strain. Besides, the polymer film has low moisture permeability and thus has excellent resistance to humidity.

The transparent protective film preferably is a film based on cellulose resin such as triacetyl cellulose or the like or a film based on norbornene resin, from the viewpoint of a polarization property, durability, etc. Examples of a commercially available product of the transparent protective film include "FUJITAC (trade name)" (manufactured by FUJI-FILM Corporation), "ZEONOR (trade name)" (manufactured by ZEON CORPORATION), and "ARTON (trade name)" (manufactured by JSR Corporation). The thickness of the transparent protective film is not particularly limited, and preferably is in the range from, for example, 1 to 500 µm from the viewpoint of the strength, workability such as handleability, and thinness.

The configuration of the polarizing plate including the hard coat film is not particularly limited. For example, the polarizing plate may be configured so that: a transparent protective film, a polarizer, and another transparent protective film are laminated on the hard coat film in this order; or a polarizer and a transparent protective film are laminated on the hard coat film in this order.

Figure 2:
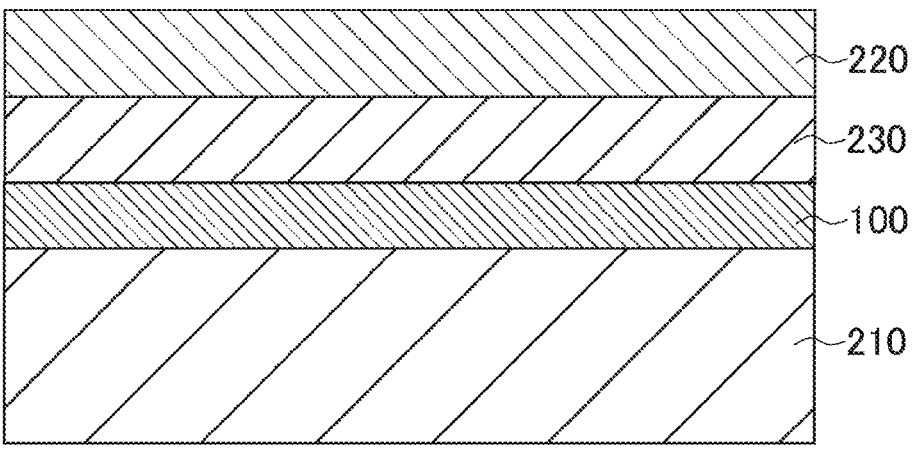
FIG. 2 is a schematic sectional view showing an example of the structure of the image display device according to the present invention.

FIG. 2 shows an example of the structure of the image display device of the present invention. FIG. 2 is a schematic sectional view showing an example of the structure of the image display device of the present invention. As shown in FIG. 2, this image display device 200 includes an image display device main body 210, a hard coat film 100, and a front plate 220. The hard coat film 100 is arranged on the visible side surface of the image display device main body 210. This hard coat film 100 is the above-described hard coat film of the present invention. The hard coat film 100 and the front plate 220 are attached to each other via an interlayer filler 230.

Examples of the image display device main body include LCD, PDP, ELD, and CRT. In the case of LCD, the image display device main body can be produced by assembling components such as a liquid crystal cell, an optical element (e.g., a polarizing plate), and, when necessary, a lighting system (e.g., a backlight) as appropriate, and then incorporating a driving circuit, for example.

The front plate is not particularly limited, and any conventionally known front plate can be used. The material, thickness, etc. of the front plate can be selected as appropriate depending on the intended use of the image display device, for example.

As the interlayer filler, those described above can be used, for example. Any one of the interlayer fillers can be used alone, or two or more of them may be used in combination. As the interlayer filler, a solventless interlayer filler is preferable.

The front plate can be attached to the hard coat film of the present invention in the following manner, for example. First, an interlayer filler is provided. At this time, the viscosity of the interlayer filler is set to a desired value so that it satisfies the relationship with the Si atomic percentage on the surface of the hard coat layer provided on the hard coat film of the present invention (the relationship of the formula (1)). The method for setting the viscosity of the interlayer filler to a desired value as described above also can be referred to as a method for preventing the repelling of the interlayer filler, for example. Thereafter, the interlayer filler is applied to the surface of the hard coat layer, and the front plate is then placed on the thus-obtained interlayer filler coating. For example, by curing the interlayer filler in this state, the hard coat film of the present invention and the front plate are attached to each other. In the present invention, at the time of applying the interlayer filler to the surface of the hard coat layer, the interlayer filler is prevented from being repelled by the surface of the hard coat layer. Thus, it is possible to keep the state where the wet interlayer filler spreads uniformly over the entire surface of the hard coat layer.

In the image display device of the present invention, an optical film to be arranged on the surface of the image display device main body is not limited to the hard coat film of the present invention. In the image display device of the present invention, other than the hard coat film of the present invention, an optical film including an optically functional layer other than the above-described hard coat layer, an optical film not including the above-described optically functional layer, the above-described polarizing plate, or the like may be arranged on the surface of the image display device main body.

The image display device of the present invention can be applied to any suitable use. Examples of the use of the image display device include: office automation equipment such as desktop computers, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores; security devices such as surveillance monitors; and nursing care and medical devices such as nursing-care monitors and medical monitors.

EXAMPLES

Next, examples of the present invention will be described together with comparative examples. It is to be noted, however, the present invention is by no means limited by the following examples and comparative examples. The evaluation and measurement of various characteristics described in the respective examples and comparative examples were carried out in the following manners.

(Evaluation of Repelling of Interlayer Filler)

A sample of an optical film produced in each example and comparative example was prepared by transferring a pressure-sensitive adhesive to a surface to which a coating solution had not been applied (i.e., the surface on the resin film side) and then attaching the optical film to a glass plate of 8 cm×8 cm. Each of solventless resins (interlayer fillers) with various viscosities was added dropwise to the optical film sample and then applied uniformly to the entire surface using a spin coater at 2000 rpm for 15 seconds. The sample was then allowed to stand for 30 minutes. Thereafter, if the coating shrank inwardly from the four sides of the optical film owing to the repelling of the interlayer filler, the width of such repelling (hereinafter simply referred to as the "repelling width") was determined. Specifically, if the shrinkage of the coating occurred, the vertical distance from each side of the optical film to a point where the amount of the inward shrinkage of the coating was the greatest (i.e., the longest vertical distance from each side of the optical film to the coating in a portion of the optical film no longer coated with the interlayer filler as a result of the repelling) was measured with a vernier caliper. Thus, the repelling widths were measured from the respective sides of the sample (n=4). The average of the thus-measured four repelling widths was determined and set to a measured value of the repelling width (the average repelling width).

(Measurement of Atomic Percentage by ESCA (Electron Spectroscopy for Chemical Analysis))

A sample piece obtained by cutting out a 5 mm×5 mm square piece out of the optical film produced in each example and comparative example was arranged on a molybdenum (Mo) plate, and the Mo plate having the sample piece thereon was mounted on a sample support stage. Then, the atomic intensity was measured using a "QUANTUM 2000" manufactured by ULVAC-PHI, Incorporated. The measurement conditions were as follows: the X-ray source was Monochrome AlKα, the X-ray output was 30 W (15 kV), the measurement region was 200 μmφ, and the photoelectron takeoff angle was 45° with respect to the surface of the sample piece. Correction of the bond energy was achieved by correcting a peak caused by the C—C bond of a C1s spectrum to 285.0 eV. Neutralization was achieved by using a neutralization gun and an Ar ion gun (in a neutralization mode) in combination. Under the above-described measurement conditions, it is possible to measure the ratio of the intensities of the respective atoms in a region of the sample piece with a depth of about 5 to 10 nm from the outermost surface. In order to remove contaminants, the surface of the sample piece was cleaned beforehand by wiping the surface with the strength not to damage the surface. Also, contaminants were removed by etching the surface with a C60 ion gun.

(Evaluation of Film Appearance)

To a surface of the optical film obtained in each example and comparative example to which a coating solution had not been applied, a black PET film (manufactured by Lintec Corporation, thickness: 75 μm) was attached via a pressure-sensitive adhesive. Thus, a sample of the optical film with the anti-reflection-treated back surface was produced. Visual inspection was performed by irradiating the coating solution applied surface of the sample with a fluorescent lamp (a three-wavelength light source), and the appearance of the optical film was evaluated according to the following criteria. In the visual inspection, the following evaluation criteria (the evaluation criteria 1 and 2) were employed as appropriate based on the presence or absence of an anti-glare hard coat layer formed on a resin film.

Evaluation criteria 1 (the anti-glare hard coat layer: present)
  G: no noticeable irregularity (no black and white gradation, and uniform anti-glare properties had been imparted to the optical film)
  NG: irregularity was outstanding (black and white gradation patterns were observed clearly)

Evaluation criteria 2 (the anti-glare hard coat layer: absent)
  G: no noticeable irregularity (no interference irregularity)
  NG: irregularity was outstanding (interference irregularity occurred, resulting in outstanding iridescent patterns)

Example 1

As a transparent support (resin film), a triacetylcellulose film with a thickness of 80 μm (FUJIFILM Corporation, trade name "TAC-TD80U") was provided. A coating solution (hard coat agent) was prepared by mixing: 100 parts by weight of polyfunctional urethane acrylate (DIC Corporation, trade name "UNIDIC 17-806"); 5.0 parts by weight of a photopolymerization initiator (Ciba Specialty Chemicals Inc., trade name "IRGACURE 907"); 5.0 parts by weight of light diffusing particles (polystyrene-polymethyl methacrylate copolymer particles manufactured by Sekisui Plastics Co., Ltd., trade name "SSX 103 DXE", weight average particle diameter: 3.0 μm); as solvents, 79.2 parts by weight of isopropyl alcohol (IPA) and 34.0 parts by weight of cyclopentanone (CPN); and 1.0 parts by weight of a fluorine leveling agent (DIC Corporation, trade name "MEGAFAC F556"). This coating solution was applied using a wire bar #7, and was dried in a drying oven at 60° C. for 1 minute. The solvents were evaporated, whereby the coating was formed. Thereafter, the coating was cured by ultraviolet irradiation (illuminance: 40 mW/cm$^2$, irradiation dose: 250 mJ/cm$^2$) using an air-cooled mercury lamp of 160 W/cm$^2$ (EYE GRAPHICS CO., LTD.) in an atmosphere with an oxygen concentration of 5000 ppm. In this manner, an anti-glare hard coat layer (anti-glare hard coat film) was formed on the resin film. The anti-glare hard coat film was immersed in an NaOH aqueous solution (55° C.) with an NaOH concentration adjusted to 10 wt % for 20 seconds, and then was dried for 30 seconds in a drying oven at 65° C. Thus, an optical film of Example 1 was produced. An acrylic monomer (Shin-Nakamura Chemical Co., Ltd., trade name "DPHA", viscosity: 5.5 Pa·s/25° C.) was used as an interlayer filler, and repelling of the interlayer filler by this optical film was evaluated.

Example 2

An optical film of Example 2 was produced in the same manner as in Example 1, except that the coating was cured in an atmosphere with an oxygen concentration of 10000 ppm. The same interlayer filler as in Example 1 (viscosity: 5.5 Pa·s/25° C.) was used as an interlayer filler, and repelling of the interlayer filler by this optical film was evaluated.

Example 3

An optical film of Example 3 was produced in the same manner as in Example 1, except that the coating was cured in an atmosphere with an oxygen concentration of 7500 ppm. The same interlayer filler as in Example 1 (viscosity: 5.5 Pa·s/25° C.) was used as an interlayer filler, and repelling of the interlayer filler by this optical film was evaluated.

Example 4

An optical film of Example 4 was produced in the same manner as in Example 1. A UV-curable adhesive (a solventless UV reactive adhesive manufacture by Sony Chemicals Corporation, viscosity: 8.5 Pa·s/25° C.) was used as an interlayer filler, and repelling of the interlayer filler by this optical film was evaluated.

Example 5

An optical film of Example 5 was produced in the same manner as in Example 1, except that the coating was cured in an atmosphere with an oxygen concentration of 7500 ppm. A solventless acrylate resin (Nippon Paint Co., Ltd., trade name "LUCIFRAL 12", viscosity: 1.0 Pa·s/25° C.) was used as an interlayer filler, and repelling of the interlayer filler by this optical film was evaluated.

Example 6

An optical film of Example 6 was produced in the same manner as in Example 2. The same solventless acrylate resin as in Example 5 (viscosity: 1.0 Pa·s/25° C.) was used as an interlayer filler, and repelling of the interlayer filler by this optical film was evaluated.

Example 7

An optical film of Example 7 was produced in the same manner as in Example 2. The same UV-curable adhesive as in Example 4 (viscosity: 8.5 Pa·s/25° C.) was used as an interlayer filler, and repelling of the interlayer filler by this optical film was evaluated.

Example 8

An optical film of Example 8 was produced in the same manner as in Example 3. The same UV-curable adhesive as in Example 4 (viscosity: 8.5 Pa·s/25° C.) was used as an interlayer filler, and repelling of the interlayer filler by this optical film was evaluated.

Example 9

An optical film of Example 9 was produced in the same manner as in Example 1, except that, as a leveling agent, "MEGAFAC F477 (trade name)" manufactured by DIC Corporation was used instead of the fluorine leveling agent and that the coating was cured in an atmosphere with an oxygen concentration of 150 ppm. The same solventless acrylate resin as in Example 5 (viscosity: 1.0 Pa·s/25° C.) was used as an interlayer filler, and repelling of the interlayer filler by this optical film was evaluated.

Example 10

An optical film of Example 10 was produced in the same manner as in Example 9. The same acrylic monomer as in Example 1 (viscosity: 5.5 Pa·s/25° C.) was used as an interlayer filler, and repelling of the interlayer filler by this optical film was evaluated.

Example 11

An optical film of Example 11 was produced in the same manner as in Example 9. The same UV-curable adhesive as in Example 4 (viscosity: 8.5 Pa·s/25° C.) was used as an interlayer filler, and repelling of the interlayer filler by this optical film was evaluated.

Example 12

An optical film of Example 12 was produced in the same manner as in Example 1, except that the coating was cured in an atmosphere with an oxygen concentration of 2500 ppm. The same acrylic monomer as in Example 1 (viscosity: 5.5 Pa·s/25° C.) was used as an interlayer filler, and repelling of the interlayer filler by this optical film was evaluated.

Example 13

An optical film of Example 13 was produced in the same manner as in Example 1, except that the coating was cured in an atmosphere with an oxygen concentration of 2500 ppm. The same UV-curable adhesive as in Example 4 (viscosity: 8.5 Pa·s/25° C.) was used as an interlayer filler, and repelling of the interlayer filler by this optical film was evaluated.

Example 14

The same triacetylcellulose film as in Example 1 was provided as a resin film. This resin film was immersed for 20 seconds in an NaOH aqueous solution (55° C.) with an NaOH concentration adjusted to 10 wt %, and then was dried for 30 seconds in a drying oven at 65° C. Thus, an optical film of Example 14 was produced. The same acrylic monomer as in Example 1 (viscosity: 5.5 Pa·s/25° C.) was used as an interlayer filler, and repelling of the interlayer filler by this optical film was evaluated.

Comparative Example 1

A coating solution (hard coat agent) was prepared in the same manner as in Example 1, except that, as a leveling agent, a silicone reactive leveling agent (DIC Corporation, trade name: "GRANDIC PC4100") was used instead of the fluorine leveling agent. An optical film of Comparative Example 1 was produced in the same manner as in Example 1, except that this coating solution was used. The same interlayer filler as in Example 1 (viscosity: 5.5 Pa·s/25° C.) was used as an interlayer filler, and repelling of the interlayer filler by this optical film was evaluated.

Comparative Example 2

An optical film of Comparative Example 2 was produced in the same manner as in Comparative Example 1. The same solventless acrylate resin as in Example 5 (viscosity: 1.0 Pa·s/25° C.) was used as an interlayer filler, and repelling of the interlayer filler by this optical film was evaluated.

Comparative Example 3

An optical film of Comparative Example 3 was produced in the same manner as in Comparative Example 1. The same UV-curable adhesive as in Example 4 (viscosity: 8.5 Pa·s/25° C.) was used as an interlayer filler, and repelling of the interlayer filler by this optical film was evaluated.

Comparative Example 4

An optical film of Comparative Example 4 was produced in the same manner as in Example 1, except that the coating was cured in an atmosphere with an oxygen concentration of 150 ppm. The same solventless acrylate resin as in Example 5 (viscosity: 1.0 Pa·s/25° C.) was used as an interlayer filler, and repelling of the interlayer filler by this optical film was evaluated.

Comparative Example 5

An optical film of Comparative Example 5 was produced in the same manner as in Example 1. The same solventless acrylate resin as in Example 5 (viscosity: 1.0 Pa·s/25° C.) was used as an interlayer filler, and repelling of the interlayer filler by this optical film was evaluated.

Comparative Example 6

An optical film of Comparative Example 6 was produced in the same manner as in Example 1, except that the coating was cured in an atmosphere with an oxygen concentration of 150 ppm. The same acrylic monomer as in Example 1 (viscosity: 5.5 Pa·s/25° C.) was used as an interlayer filler, and repelling of the interlayer filler by this optical film was evaluated.

Comparative Example 7

An optical film of Comparative Example 7 was produced in the same manner as in Comparative Example 6. The same UV-curable adhesive as in Example 4 (viscosity: 8.5 Pa·s/25° C.) was used as an interlayer filler, and repelling of the interlayer filler by this optical film was evaluated.

Comparative Example 8

An optical film of Comparative Example 8 was produced in the same manner as in Example 1, except that the coating was cured in an atmosphere with an oxygen concentration of 2500 ppm. The same solventless acrylate resin as in Example 5 (viscosity: 1.0 Pa·s/25° C.) was used as an interlayer filler, and repelling of the interlayer filler by this optical film was evaluated.

Table 1 below shows the results of the measurement and the evaluation of various characteristics of the thus-obtained optical films of Examples 1 to 14 and Comparative Examples 1 to 8.

TABLE 1

| | leveling agent | | | | ESCA (atm %) | | viscosity of interlayer filler | | repelling width of interlayer filler |
| | type | parts by weight | oxygen concentration (ppm) | surface treatment | Si (b) | O | (a) (Pa · s) | appearance | (mm) |
|---|---|---|---|---|---|---|---|---|---|
| Ex. 1 | unreactive | 1.0 | 5000 | saponification | 2.15 | 26.45 | 5.5 | G | 8.5 |
| Ex. 2 | unreactive | 1.0 | 10000 | saponification | 1.75 | 30.1 | 5.5 | G | 5.75 |
| Ex. 3 | unreactive | 1.0 | 7500 | saponification | 1.65 | 26.2 | 5.5 | G | 7.35 |
| Ex. 4 | unreactive | 1.0 | 5000 | saponification | 2.15 | 26.45 | 8.5 | G | 4.25 |
| Ex. 5 | unreactive | 1.0 | 7500 | saponification | 1.65 | 26.2 | 1.0 | G | 13.5 |
| Ex. 6 | unreactive | 1.0 | 10000 | saponification | 1.75 | 30.1 | 1.0 | G | 10 |
| Ex. 7 | unreactive | 1.0 | 10000 | saponification | 1.75 | 30.1 | 8.5 | G | 1.75 |
| Ex. 8 | unreactive | 1.0 | 7500 | saponification | 1.65 | 26.2 | 8.5 | G | 2 |
| Ex. 9 | unreactive (F477) | 1.0 | 150 | saponification | 1.55 | 27.35 | 1.0 | G | 13.25 |
| Ex. 10 | unreactive (F477) | 1.0 | 150 | saponification | 1.55 | 27.35 | 5.5 | G | 6.5 |
| Ex. 11 | unreactive (F477) | 1.0 | 150 | saponification | 1.55 | 27.35 | 8.5 | G | 4.75 |
| Ex. 12 | unreactive | 1.0 | 2500 | saponification | 2.35 | 26.8 | 5.5 | G | 8 |
| Ex. 13 | unreactive | 1.0 | 2500 | saponification | 2.35 | 26.8 | 8.5 | G | 5.25 |
| Ex. 14 | — | — | — | saponification | 0 | 39.9 | 5.5 | G | 0 |
| Comp. Ex. 1 | reactive | 1.0 | 5000 | saponification | 4.15 | 27.55 | 5.5 | G | 23.75 |
| Comp. Ex. 2 | reactive | 1.0 | 5000 | saponification | 4.15 | 27.55 | 1.0 | G | 35 |
| Comp. Ex. 3 | reactive | 1.0 | 5000 | saponification | 4.15 | 27.55 | 8.5 | G | 21 |
| Comp. Ex. 4 | unreactive | 1.0 | 150 | saponification | 2.35 | 25.35 | 1.0 | G | 35 |
| Comp. Ex. 5 | unreactive | 1.0 | 5000 | saponification | 2.15 | 26.45 | 1.0 | G | 22.75 |
| Comp. Ex. 6 | unreactive | 1.0 | 150 | saponification | 2.35 | 25.35 | 5.5 | G | 19 |
| Comp. Ex. 7 | unreactive | 1.0 | 150 | saponification | 2.35 | 25.35 | 8.5 | G | 16 |
| Comp. Ex. 8 | unreactive | 1.0 | 2500 | saponification | 2.35 | 26.8 | 1.0 | G | 18 |

As can be seen from Table 1, in the optical films of Examples 1 to 13 each including the anti-glare hard coat layer, the repelling widths of the interlayer fillers with the respective viscosities were all not more than 14 mm. This demonstrates that the optical films of Examples 1 to 13 allow uniform application of the interlayer fillers. In particular, in the optical films of Examples 1 to 4, 6 to 8, and 10 to 13, the repelling widths of the interlayer fillers were not more than 10 mm, from which it was found that these optical films allow still more uniform application of the interlayer fillers. Also, the optical film of Example 14 not including an anti-glare hard coat layer did not repel the interlayer filler (the repelling width of the interlayer filler: 0 mm) because the Si atomic percentage and the viscosity of the interlayer filler satisfied the relationship of the formula (1). Besides, the optical films of Examples 1 to 14 each had good appearance before the application of the interlayer filler. On the other hand, in the optical films of Comparative Example 1 to 5 and 8 in which the Si atomic percentage after the surface modification and the viscosity of the interlayer filler did not satisfy the relationship of the formula (1), the repelling widths were all greater than 15 mm. Also, in the optical films of Comparative Examples 6 and 7 in which the O atomic percentage on their surfaces were less than 26 atm %, the repelling widths were both greater than 15 mm. In Comparative Example 1 to 3, the Si atomic percentages were high after the surface modification. In these comparative examples, the reactive leveling agent was used, and it is considered that the surface modification under such conditions could not decrease the Si atomic percentage.

Figure 3A:
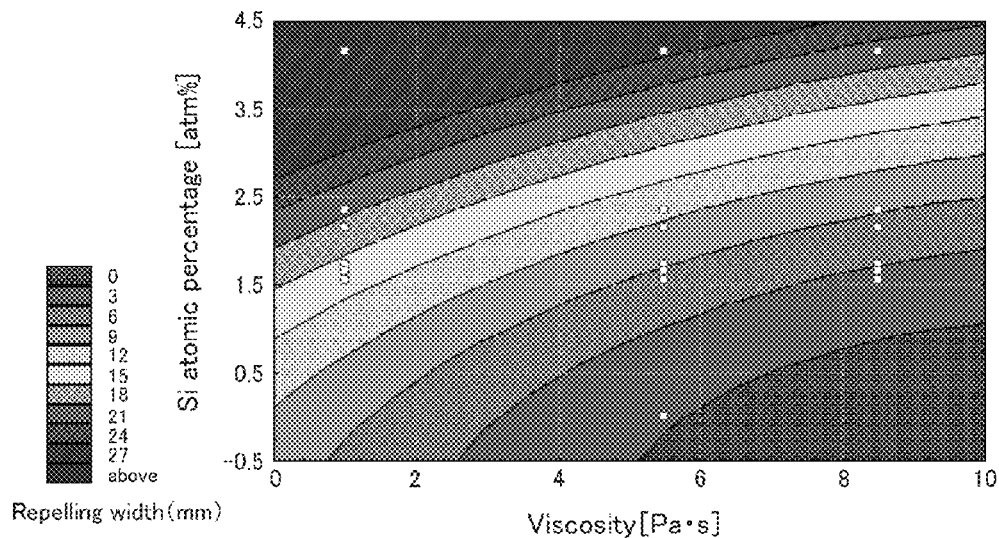
FIG. 3A is a graph showing, in each of optical films according to Examples 1 to 14 and Comparative Examples 1 to 3, 5, and 8, the relationship between the Si atomic percentage on a surface of the optical film and the viscosity of an interlayer filler.
Figure 3B:
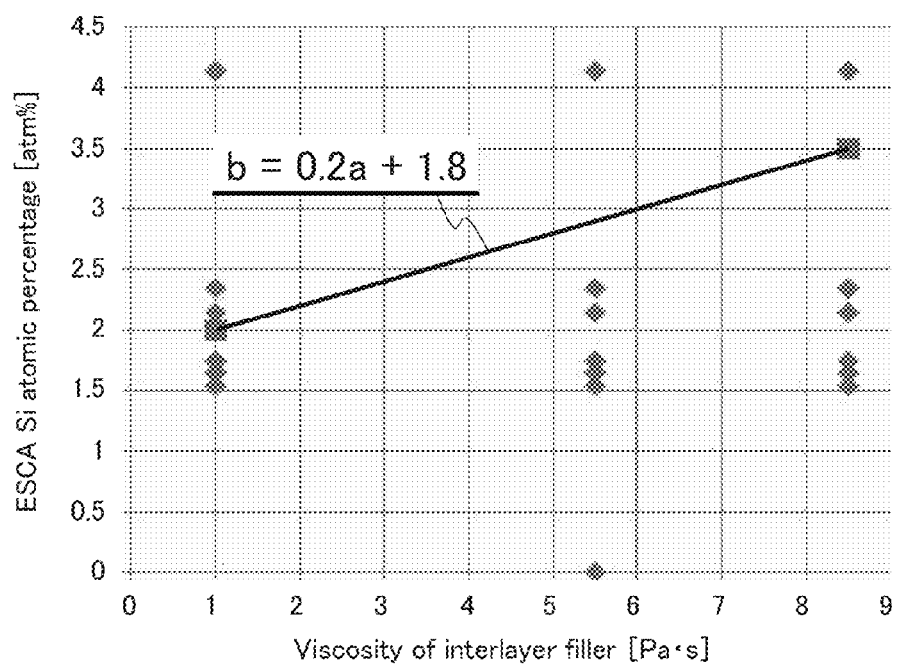
FIG. 3B is a graph showing the result of calculation for deriving the relational expression between the Si atomic percentage on the surface of the optical film and the viscosity of an interlayer filler according to the Box-Wilson method based on the relationships shown in FIG. 3A.

FIG. 3A is a graph showing, in each of the optical films according to Examples 1 to 14 and Comparative Examples 1 to 3, 5, and 8, the relationship between the Si atomic percentage on the surface of the optical film and the viscosity of the interlayer filler. In FIG. 3A, the horizontal axis indicates the viscosity of the interlayer filler (Pa·s), and the vertical axis indicates the Si atomic percentage (atm %) on the surface of the optical film. Based on the plots obtained in the respective examples and comparative examples, the relational expression $b=0.2a+1.8$ (a: viscosity of interlayer filler (Pa·s), b: Si atomic percentage (atm %) on optical film surface, $R^2=0.9527$) was derived according to the Box-Wilson method, as shown in FIG. 3B.

The present invention provides an optical film to be arranged on a display surface, which is adapted so as to allow uniform application of an interlayer filler and thus also is applicable to an image display device equipped with a front plate. The use of the optical film of the present invention thus is not limited, and the optical film is applicable to a wide range of fields. For example, the optical film of the present invention can be used suitably for optical elements such as a polarizing plate, liquid crystal panels, and image display devices such as LCD (liquid crystal display) and O LED (organic EL display).

The optical film according to the present invention is an optical film for use in an image display device. The optical film is adapted so that a relationship of the following formula (1) is satisfied:

$$b \leq 0.2a+1.8 \quad (1),$$

where a is a pure number obtained by removing the unit of measurement from the viscosity (Pa·s) of an interlayer filler at the time of attaching a front plate to a surface of the optical film via the interlayer filler, and b is a pure number obtained by removing the unit of measurement from the atomic percentage (atm %) of silicon atoms on the surface of the optical film. The atomic percentage of oxygen atoms on the surface of the optical film is at least 26 atm %.

The embodiments and the examples are illustrations, and do not limit the present invention. The present invention may be achieved by other embodiments as long as the purpose and the basic characteristics of the present invention are not departed. The scope of the invention is defined by the appended claims. Various changes and equivalents, which are understood by those skilled in the art in the scope of the present invention can be applied to the configuration and detail of the present invention.

REFERENCE CHARACTERS LIST

100: hard coat film
110: resin film
120: hard coat layer
200: image display device
210: image display device main body
220: front plate
230: interlayer filler

What is claimed is:

1. An optical film for use in an image display device equipped with a front plate, wherein the optical film is adapted so that a relationship of the following formula (1) is satisfied:

$$b \leq 0.2a+1.8 \quad (1),$$

wherein a is a viscosity (Pa·s) of an interlayer filler at the time of attaching the front plate to a surface of the optical film via the interlayer filler, and b is an atomic percentage (atm %) of silicon atoms on the surface of the optical film, and the atomic percentage of oxygen atoms on the surface of the optical film is at least 26 atm %.

2. The optical film according to claim 1, wherein the optical film includes a hard coat layer.

3. The optical film according to claim 2, wherein the hard coat layer has been formed in an atmosphere with an oxygen concentration of 500 to 50000 ppm.

4. The optical film according to claim 2, wherein the hard coat layer contains a leveling agent.

5. The optical film according to claim 4, wherein the leveling agent is an unreactive leveling agent.

6. The optical film according to claim 1, wherein the surface of the optical film undergoes at least one treatment selected from the group consisting of: a solvent treatment, an alkali treatment, a plasma irradiation treatment, and a corona irradiation treatment.

7. An image display device comprising:
a front plate; and
an optical film arranged on a surface of the front plate, the front plate being attached to the optical film via an interlayer filler,
wherein the optical film is the optical film according to claim 1.

8. The image display device according to claim 7, wherein the interlayer filler is an active energy ray-curable resin.

9. A method for producing an image display device that comprises a front plate and an optical film, the method comprising the steps of:
applying an interlayer filler to a surface of the optical film; and
attaching the front plate to the surface of the optical film to which the interlayer filler has been applied,
wherein the optical film is the optical film according to claim 1.

10. The method according to claim 9, wherein
the optical film is a hard coat film including a hard coat layer, and
in the interlayer filler applying step, the interlayer filler is applied to a surface of the hard coat layer.

11. The method according to claim 9, further comprising, prior to the step of applying an interlayer filler, a step of modifying the surface of the optical film,
wherein, in the step of modifying the surface of the optical film, the surface of the optical film is modified by at least one treatment selected from the group consisting of: a solvent treatment, an alkali treatment, a plasma irradiation treatment, and a corona irradiation treatment.

12. The optical film according to claim 1, wherein the surface of the optical film undergoes an alkali treatment.

* * * * *